United States Patent
Frey et al.

(10) Patent No.: US 6,235,804 B1
(45) Date of Patent: May 22, 2001

(54) SILICONE SURFACTANTS FOR MAKING POLYURETHANE FLEXIBLE MOLDED FOAMS

(75) Inventors: John Herbert Frey, Allentown, PA (US); David Robert Battice, Prudenville, MI (US); Allen Robert Arnold, Jr., Catasauqua, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/471,980

(22) Filed: Dec. 23, 1999

(51) Int. Cl.$^7$ ............................................. C08J 9/04
(52) U.S. Cl. .................... 521/112; 521/134; 521/155; 521/170; 521/174
(58) Field of Search .................... 521/112, 134, 521/155, 170, 174

(56) References Cited

U.S. PATENT DOCUMENTS

| | | |
|---|---|---|
| 3,402,192 | 9/1968 | Haluska . |
| 4,031,044 | 6/1977 | Joslyn . |
| 4,139,503 | 2/1979 | Kollmeier et al. . |
| 4,347,330 | 8/1982 | Demou et al. . |
| 4,690,955 | 9/1987 | Kilgour et al. . |
| 5,633,292 | 5/1997 | Brune et al. . |
| 5,844,010 * | 12/1998 | Burkhart et al. ................ 521/112 |

* cited by examiner

Primary Examiner—John M. Cooney, Jr.
(74) Attorney, Agent, or Firm—Michael Leach

(57) ABSTRACT

A method for preparing a polyurethane flexible molded by reacting an organic polyisocyanate with a polyol in the presence of urethane catalyst, water as a blowing agent, optionally a cell opener, and a silicone surfactant cell stabilizer having the formula:

$$Me_3Si(OSiMe_2)_x(OSiMeG)_yOSiMe_3$$

wherein G is a group having the formula —D(OR″)$_m$A where D is a divalent organic linking radical, R″ is an alkylene group, m has an average value from 1 to 5, A denotes an —OR‴ or an —OOCR‴ group, where R‴ is selected from the group consisting of methyl, ethyl, and a combination of methyl and ethyl, x has an average value from 1 to 3 and y has an average value from 0.25 to 1, the value of x/y is from 2.5 to 5 and the value of x+y is from 1.5 to 3.5.

21 Claims, No Drawings

SILICONE SURFACTANTS FOR MAKING POLYURETHANE FLEXIBLE MOLDED FOAMS

FIELD OF THE INVENTION

The invention relates to making polyurethane flexible molded foams using particular silicone polyether copolymers as cell stabilizers. The invention affords a method for making water blown polyurethane flexible molded foams with improved surface quality.

BACKGROUND OF THE INVENTION

Polyurethane foam production involves metering and pumping of the resin and isocyanate ingredients, which are prepared into a number of liquid components or streams, to the mixer where they are mixed thoroughly and dispensed. A typical formulation comprises two streams consisting of the isocyanate and the resin. The resin stream is a mixture of polyols, crosslinking agent such as diethanolamine (DEOA), surfactant, catalyst, water, auxiliary blowing agents, and other possible additives.

Foams demonstrating good stability have more improved, isotropic physical properties, and are more easily processed with existing equipment. More specifically, molded foams with good bulk, vent, and shear stability are characterized as having small, uniform cellular structure throughout the interior of the foam. Polyurethane foams with superior surface stabilization have a layer of fine cells adjacent to the outer surface of the foam. Foams that are dimensionally stable, typically also open-celled, exhibit a reduced tendency to shrink immediately after being removed from a mold. Non-molded flexible foams require good bulk stabilization and dimensional stability, which if not present will lead to foam collapse or densification. Reduced emissions of additives in flexible foam can lead to reduced fogging on interior automobile windshields.

In the past, chemical strategies for selecting formulation variables in order to optimize the bulk, shear, vent, surface, and dimensional stability have been very successful for many applications. Key variables include the judicious selection of surfactants and catalysts. The foam industry now has changed their strategy to one of maintaining foam physical properties while at the same time reducing their raw materials and/or processing costs. Approaches include reducing density by using less wet chemicals or injecting liquid carbon dioxide, lowering the amount of relatively expensive graft copolymers, using blends of TDI/MDI, and incorporating isocyanate terminated pre-polymers. All of these approaches have placed increasing challenges on the accompanying additives which could not be fully met using known prior art.

Silicone surfactants used for the production of flexible polyurethane foams are typically polydimethylsiloxanes, organofunctional polydimethylsiloxanes or siloxane polyether copolymers.

U.S. Pat. No. 3 402 192 discloses polyoxyalkylene siloxane branch copolymers useful in the preparation of polyurethane foams.

U.S. Pat. No. 4 031 044 discloses siloxane-oxyalkylene copolymer surfactants as foam stabilizers for making polyether based high resilient flexible foam. U.S. '044 teaches a very broad class of structures, but the general class that is closely related to the present invention can be described by the formula

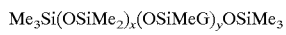

wherein G is a group having the formula —D(OR")$_m$A wherein D is a divalent linking group such as an alkylene group, R" is composed of propylene groups and groups selected from the group consisting of ethylene and butylene groups wherein the amount of ethylene and butylene is less than 35 wt % of the total (OR") group, m has an average value from 1 to 15, and A is either an —OR', —OOCR' or —OOCOOR' group where R' is a group free of aliphatic unsaturation selected from the group consisting of hydrocarbon and hydrocarbonoxy groups. When the average value of x is 0–7, then y has an average value of 1–5; when x=0, y=1–5; when x=1 or 2, then y=1–4; when x=3 or 4, then y=1–3; when x is 5, then y is 1–2; and when x is 6 or 7, then y=1. See Example 7 for specific embodiments.

U.S. Pat. No. 4 139 503 discloses the use of specific siloxane components at 0.01 to 2 g/100 g of polyol for the production of high resilience, open celled polyurethane foam. This patent only shows examples for polydimethylsilicones.

U.S. Pat. No. 4 347 330 discloses improved high resilience open celled flexible molded polyurethane foam by incorporating three cell modifiers consisting of a polysiloxane-polyoxyalkylene copolymer, a polymethylsiloxane, and a polyether polyol cell modifier containing polyoxyethylene groups in amount of at least about 80 percent by weight of the polyether polyol.

U.S. Pat. No. 4 690 955 discloses siloxane polyether copolymer surfactants with mixed hydroxy alkoxy capping for stabilizing molded flexible foam.

U.S. Pat. No. 5 633 292 discloses a method for the production of high resilience polyurethane foams using a surfactant containing alkyl substituents rather than alkoxy substituents.

The present invention involves the use of a certain narrow class of silicone polyether copolymers belonging to a specific structure range to provide improvement in flexible polyurethane foam surface quality.

SUMMARY OF THE INVENTION

The invention is a method for preparing polyurethane flexible molded foam using a class of silicone polyether copolymer surfactants belonging to a specific structure range. The method comprises reacting an organic polyisocyanate and a polyol in the presence of a catalyst composition, a blowing agent, a silicone polyether copolymer surfactant cell stabilizer, and optionally a cell opening agent. Suitable silicone polyether copolymers have the formula:

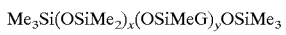

wherein G is a group having the formula —D(OR")$_m$A where D is a divalent organic linking radical, R" is an alkylene group, m has an average value from 1 to 5, A denotes an —OR'" or an —OOCR'" group, where R'" is selected from the group consisting of methyl, ethyl, and a combination of methyl and ethyl, x has an average value from 1 to 3 and y has an average value from 0.25 to 1, the value of x/y is from 2.5 to 5 and the value of x+y is from 1.5 to 3.5.

The polyurethane foam may be prepared using a conventional molded flexible polyurethane foam process or the "quasi-prepolymer" molded flexible polyurethane foam process.

Another embodiment of the invention comprises the silicone polyether surfactants of the above defined structure.

The use of these particular silicone surfactants in making polyurethane flexible molded foam affords the following advantage:

Improved surface quality without a higher force-to-crush (FTC) value which will be a benefit to foam quality through better cell structure and better dimensional stability.

DETAILED DESCRIPTION OF THE INVENTION

The cell stabilizers used in the preparation of the flexible molded foams comprise a silicone polyether copolymer having the formula:

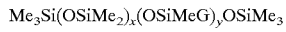

$$Me_3Si(OSiMe_2)_x(OSiMeG)_yOSiMe_3$$

wherein x has an average value from 1 to 3 and y has an average value from 0.25 to 1, the value of x/y is from 2.5 to 5, preferably 2.5 to 3.5, especially about 3, and the value of x+y is from 1.5 to 3.5, preferably 1.5 to 2.5, especially about 2. G is a group having the formula —D(OR")$_m$A where D is a divalent organic linking radical and R" is an alkylene group. The divalent organic linking radical D is exemplified by alkylene groups having from 3 to 5 carbon atoms. It is especially preferred that D is propylene. R" is an alkylene group and m has an average value from 1 to 5, preferably 2 to 3. The alkylene group R" is exemplified by ethylene, propylene, butylene, or a combination thereof, but it is especially preferred that R" is propylene. In the above formula A denotes an —OR'" group or an —OOCR'" group, where R'" is selected from the group consisting of methyl, ethyl, or a combination thereof. Preferably G is a group having the structure

$$—CH_2CH_2CH_2(OCH(CH_3)CH_2)_2OCH_3.$$

The silicone polyether copolymer surfactants are used in an amount of 0.01 to 0.8, preferably 0.05 to 0.4, wt. parts per hundred wt. parts polyol (pphpp).

These silicone polyether copolymer surfactants can be prepared according to the techniques well known in the art, for example as taught in U.S. Pat. No. 4 031 044 which is incorporated herein by reference, and can optionally, but preferably, be used in combination with other silicone surfactants well known as cell stabilizers for making polyurethane foams, such as polydimethylsiloxanes and organofunctional polydimethylsiloxanes, and other silicone polyether copolymers and with silicone cell openers, e.g., as taught in U.S. Pat. Nos. 5,192,812 and 5,852,065 which are incorporated herein by reference. When used in such combination, the silicone cell stabilizers according to the invention may compose about 5–95 wt % of the total silicone surfactant composition.

The silicone polyether copolymer surfactants according to the invention are employed in the manufacture of polyether and polyester flexible molded polyurethane foam in the manner known to the art. In producing the polyurethane foams using these silicone surfactants, one or more polyether or polyester polyols are reacted with a polyisocyanate to provide the urethane linkage. In the present invention the polyol composition may comprise one or more of such polyols.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in flexible polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

The polyurethane products are prepared using any suitable organic polyisocyanates well known in the art including, for example, hexamethylene diisocyanate, phenylene diisocyanate, toluene diisocyanate (TDI) and 4,4'-diphenyl-methane diisocyanate (MDI). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanates and a polyether or polyester polyol.

Suitable urethane catalysts useful in the present invention are all those well known to the worker skilled in the art including tertiary amines such as triethylenediamine, N-methylimidazole, 1,2-dimethylimidazole, N-methylmorpholine, N-ethyl-morpholine, triethylamine, tributylamine, pentamethyldiethylenetriamine, pentamethyldipropylenetriamine, triethanolamine, dimethylethanolamine and bisdimethylaminodiethylether, and organotins such as stannous octoate, stannous acetate, stannous oleate, stannous laurate, dibutyltin dilaurate, and other such tin salts.

Other typical agents which may be found in the polyurethane foam formulations include chain extenders such as ethylene glycol and butanediol; crosslinkers such as diethanolamine, diisopropanolamine, triethanolamine and tripropanolamine; cell openers such as silicones; and especially blowing agents such as water, liquid carbon dioxide, acetone, pentane, HFCs, HCFCs, CFCs, methylene chloride and the like.

The preferred polyurethane flexible molded foam prepared according to the invention is a high resiliency foam.

A general polyurethane flexible molded foam formulation having a 1–3 lb/ft³ (16–48 kg/m³) density (e.g., automotive seating) containing a silicone surfactant composition according to the invention would comprise the following components in parts by weight (pbw):

| Flexible Foam Formulation | pbw |
|---|---|
| Polyol | 20–100 |
| Polymer Polyol | 80–0 |
| Cell Stabilizer | 0.01–0.8; pref 0.05–0.4 |
| Silicone Cell Opener | 0–3 |
| Blowing Agent | 2–4.5 |
| Crosslinker | 0.5–2 |
| Catalyst Composition | 0.3–2 |
| Isocyanate Index | 70–115 |

In the present invention the preferred blowing agent for making the flexible molded foams is water at 1 to 6 parts per hundred parts polyol (pphpp), especially 2 to 4.5 pphpp, optionally with other blowing agents.

Other additives may of course be employed to impart specific properties to the foam. Examples are materials such as flame retardants, colorants, fillers and hardness modifiers.

The polyurethane foams of this invention may be formed in accordance with any of the processing techniques known to the art, such as, in particular, the "one shot" technique. In accordance with this method, foamed products are provided by carrying out the reaction of the polyisocyanate and polyol simultaneously with the foaming operation. In another embodiment the molded flexible foams can also be made by the "quasi-prepolymer process" as taught in U.S. Pat. Nos. 5 708 045 and 5 650 452 which are incorporated herein by reference. In either case, it is sometimes convenient to add the silicone surfactants (cell opener and cell stabilizer) to the reaction mixture as a premixture with one or more of the blowing agent, polyol, water, and catalyst components.

It is to be understood that the relative amounts of the various components of the foam formulation are not narrowly critical. The polyol and polyisocyanate are present in the foam-producing formulation in the major amount. The relative amounts of these two components in the mixture are well known to the art. The blowing agent, catalysts, and silicone surfactant cell opener and cell stabilizer are each present in a minor amount sufficient to foam the reaction mixture. The catalysts are present in a catalytic amount, i.e., that amount necessary to catalyze the reactions to produce the urethane and urea at a reasonable rate, and the surfactant is present in the amount sufficient to impart the properties desired and to stabilize the reacting foam, for example, 0.01 to 0.8 pphpp.

In a typical preparation, the polyol. water, silicone surfactants, amine catalyst, optional tin catalyst and optional other blowing agent are blended together and finally TDI is mixed in and the composition is allowed to foam and polymerize.

The invention has the following features:

The silicone polyether copolymer surfactants have unexpectedly good surface stabilization properties when the value of x/y is greater than or equal to 2.5 and less than or equal to 5 and the value of x+y is greater than or equal to 1.5 and less than or equal to 3.5 without also increasing the force required to crush the foam. This provides a more open foam with less shrinkage after processing. Normally, an improvement in surface stabilization is accompanied by an increase in the force required to crush the foam. A preferred structure is where x=1.5 and y=0.5 with R having the structure

The silicone surfactant can be blended with dimethylsil other silicone polyether copolymers or diluents to provide further benefits and optimized performance.

EXAMPLE 1

The silicone polyether copolymer surfactants of Table 1 B were prepared by reacting a trimethylsiloxy-endblocked polydimethylsiloxane-polymethylhydrogen-siloxane copolymer having the formula

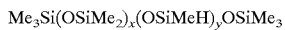

and an unsaturated polyether having the formula $CH_2=CHCH_2[OCH(CH_3)CH_2]_2OCH_3$ in the presence of a hydrosilylation catalyst according to the procedures disclosed in U.S. Pat. No. 4,031,044.

The silicone polyether copolymer surfactants were prepared in the following manner: a 3-necked round bottom flask was equipped with a reflux condenser, air powered mechanical stirrer, and a thermometer with thermowatch control. The thermometer well is fitted with a side arm gas inlet barb, which is fitted to a controlled nitrogen source. The trimethylsiloxy-endblocked polydimethylsiloxane-polymethyl-hydrogensiloxane copolymer described above (with the values of x and y described in Table 1 B below) and the unsaturated polyether described above were loaded into the flask in the amounts described in Table 1A below and the atmosphere inerted with nitrogen. A small sweep of nitrogen is maintained over the mixture by monitoring bubbling of nitrogen gas out the top of the reflux condenser through dipropylene glycol. Rate is maintained at approximately 1 bubble per second. The mixture was then stirred and the mixture heated to 75° C. Next, the mixture was catalyzed with 31.86 microliters of catalyst made up as a 0.1M solution (0.5 g chloroplatinic acid/10 ml isopropyl alcohol (IPA)). The temperature was then maintained at peak exotherm (about 140–160° C.) for one hour. The resulting product was then cooled and then stripped by applying a vacuum of about 120 mm Hg at a temperature of about 100° C. and held for about 1 hour to remove the volatiles. The product was then allowed to cool and characterized by using FTIR, GPC, and viscosity. The silicone polyethers produced are described in Table 1B.

TABLE 1A

| Example | Siloxane (g) | Unsaturated Polyether (g) |
|---|---|---|
| A | 51.07 | 48.93 |
| B | 68.12 | 31.88 |
| C | 61.02 | 38.98 |
| D | 57.90 | 42.10 |
| E | 39.86 | 60.14 |
| G1 | 52.89 | 47.12 |
| Q | 49.61 | 50.39 |
| R | 62.58 | 37.42 |
| S | 67.96 | 32.04 |
| T | 36.34 | 63.66 |

The silicone polyether copolymer surfactants of Table 1 B have the formula

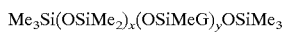

where G denotes the group —$CH_2CH_2CH_2(OCH(CH_3)CH_2)_2OCH_3$ and x and y are as defined in Table 1 B below.

TABLE 1B

| Silicone Surfactant | x | y | x/y | x + y |
|---|---|---|---|---|
| A* | 1 | 1 | 1 | 2 |
| B | 1.5 | 0.5 | 3 | 2 |
| C** | 3 | 1 | 3 | 4 |
| D | 4.5 | 1.5 | 3 | 6 |
| E | 3 | 3 | 1 | 6 |
| G1 | 2.7 | 1.3 | 2.1 | 4 |
| Q | 4.6 | 2.3 | 2 | 6.9 |
| R*** | 3 | 0.9 | 3.3 | 3.9 |
| S | 0.78 | 0.39 | 2 | 1.17 |
| T | 1.5 | 2.5 | 0.6 | 4 |

*Corresponds to surfactant (3) of Example 7 in U.S. 4 031 044
**Corresponds to surfactant (2) of Example 7 in U.S. 4 031 044
***Corresponds approximately to surfactant (2) of Example 7 in U.S. 4 031 044

In the Examples below, the silicone surfactants of Table 1 B were compared to a commercial silicone surfactant typically used in making HR flexible molded foams. In the Examples and Tables the following materials were used:

Arcol E 656 polyether polyol from Lyondell (OH#=35)
Arcol E 688 SAN polyol from Lyondell (OH#=24)
DABCO 33LV® catalyst from Air Products and Chemicals, Inc. (APCI)
DABCO® BL-11 catalyst from APCI
DABCO BL-17 catalyst from APCI
DABCO™ DEOA-LF -diethanolamine/water (85/15) from APCI
POLYCAT® 77 catalyst from APCI.
PRC-798 solvent-based release agent from ChemTrend
Specflex NC630 conventional triol from Dow Chemical
Specflex NC700 polymer polyol from Dow Chemical
TDI 80/20 from Bayer Table 1C presents the HR flexible foam formulations A and B used in the examples with the components in active parts by weight (pbw).

TABLE 1C

| FORMULATION | A | B |
|---|---|---|
| Arcol E-656 | 50 | |
| Arcol E-688 | 50 | |
| Specflex NC630 | | 60 |
| Specflex NC700 | | 40 |
| Water | 3.8 | 3.15 |
| Dabco 33LV | 0.15 | 0.3 |
| Dabco BL17 | 0.2 | |
| Dabco BL11 | | 0.2 |
| Polycat 77 | 0.15 | |
| Dabco DEOA-LF | 1.3 | |
| TDI 80/20 | 100 Index | 100 Index |

EXAMPLE 2

The polyols listed in Formulation B were combined ahead of time and stored in a container that was incubated at 70–73° F. (21–23° C.). A separate mixture of water, crosslinker, and amine catalyst was also prepared. A foam was typically created by first mixing the polyol and surfactant in a ½ gallon (1890 ml) paper cup for 20 sec at 6000 rpm using a Servodyne dispersator with a 3 inch (7.6 cm) disc mixing blade. The water-amine blend was then introduced into the same paper cup and mixed for an additional 20 sec at 6000 rpm. Next, the TDI was added to the paper cup and mixed for 5 sec. Finally, the entire cup contents were poured for 5 sec into a 155° F. (68° C.) five vent aluminum mold having the dimensions of 12×12×4 in (30×30×10 cm), pretreated with PRC-798 release agent. The mold was immediately closed. After 330 seconds the foam pad was removed from the mold and crushed by hand using a metal plate for vent and surface observations only. Force-to-Crush (FTC) was measured in absolute pounds (Newtons), with the test plate having a surface area of 50 in$^2$ (323 cm$^2$). Cured foams were later cut into one inch (2.54 cm) slices for observation of bulk, vent, and surface stability. Stability and surface measurements are rated by matching foams against internal standards, with higher values for both properties being preferred.

The data in Table 2 show the benefit of an x/y value greater than 2.5.

TABLE 2

| Silicone Surfactant | x/y | x + y | Use level (pphpp)* | Initial FTC (lb; N) | Bulk Stability | Surface Quality |
|---|---|---|---|---|---|---|
| A | 1 | 2 | 0.06 | 119; 533 | 4.1 | 2 |
| B | 3 | 2 | 0.06 | 114; 511 | 4.25 | 4 |
| D | 3 | 6 | 0.06 | 301; 1349 | 4.5 | 4.5 |
| E | 1 | 6 | 0.06 | 226; 1012 | 4.5 | 4.5 |
| G1 | 2.08 | 4 | 0.06 | 210; 941 | 4.5 | 4.25 |
| Q | 2 | 6.8 | 0.06 | 289; 1295 | 4.5 | 4.5 |
| R | 3.41 | 4 | 0.06 | 236; 1057 | 4.5 | 4 |
| S | 1.95 | 1.2 | 0.06 | 90; 403 | 3.75 | 2.5 |
| T | 0.6 | 4 | 0.06 | 161; 721 | 4.25 | 1.5 |

*Silicone Surfactant Actives

The foams prepared using Silicone Surfactants D, E, G1, Q and R having high x+y values showed good surface values >4 were achieved, but this was accompanied by unacceptably high FTC values. However, Silicone Surfactant B with an x/y value of 3 afforded a foam having good surface and a low FTC resulting from a low x+y value.

EXAMPLE 3

Example 2 was followed using Formulation A instead of Formulation B.

TABLE 3

| Silicone Surfactant | x/y | x + y | Use level (pphpp)* | Initial FTC (lb; N) | Bulk Stability | Surface Quality |
|---|---|---|---|---|---|---|
| A | 1 | 2 | 0.06 | 142; 636 | 1.65 | 1 |
| B | 3 | 2 | 0.06 | 128; 573 | 1.65 | 1.5 |
| B | 3 | 2 | 0.4 | 104; 465 | 4.25 | 4.5 |
| D | 3 | 6 | 0.06 | 212; 950 | 4.25 | 4.5 |
| E | 1 | 6 | 0.06 | 129; 578 | 2 | 1.5 |
| G1 | 2.08 | 4 | 0.06 | 122; 547 | 1.25 | 4 |
| Q | 2 | 6.8 | 0.06 | 222; 995 | 4.5 | 4.5 |
| R | 3.41 | 4 | 0.06 | 116; 520 | 1.1 | 3 |
| S | 1.95 | 1.2 | 0.06 | 62; 278 | 1.65 | 1 |
| T | 0.6 | 4 | 0.06 | 132; 591 | 3.25 | 1 |

*Silicone Surfactant Actives

The polyols used in the foam formulation for this Example 3 afforded much lower FTC values as can be observed by comparing the performance of each surfactant in Table 2 versus Table 3 at the use level of 0.06 pphpp. Because of the lower inherent stability of Formulation A in this example due to the polyol type, a higher level of surfactant should have been utilized to show the benefit of Surfactant B compared to other surfactants in the table. Although a statistical analysis of the data in this example shows the same general trend as in the previous example (high x/y and low x+y values provide excellent bulk and surface stability with low FTC values), this trend is not obvious by inspecting the data in Table 3 at the use level of 0.06. In addition, it can be shown when Surfactant B is used at a higher use level of 0.4 (see Table 3), bulk stability and surface quality are excellent with a relatively low FTC value. Other surfactants in Table 3 which have high ratings for both bulk stability and surface quality are accompanied by high FTC values.

We claim:

1. A method for preparing a polyurethane flexible molded foam which comprises reacting an organic polyisocyanate with a polyol in the presence of urethane catalyst, water as a blowing agent, optionally a cell opener, and a silicone surfactant cell stabilizer having the formula:

$$Me_3Si(OSiMe_2)_x(OSiMeG)_yOSiMe_3$$

wherein G is a group having the formula $-D(OR'')_mA$ where D is a divalent organic linking radical, R" is an alkylene group, m has an average value from 1 to 5, A denotes an —OR''' or an —OOCR''' group, where R''' is selected from the group consisting of methyl, ethyl, and a combination of methyl and ethyl, x has an average value from 1 to 3 and y has an average value from 0.25 to 1, the value of x/y is from 2.5 to 5 and the value of x+y is from 1.5 to 3.5.

2. The method of claim 1 in which x/y is 2.5 to 3.5 and x+y is 1.5 to 2.5.

3. The method of claim 1 in which m is 2 to 3.

4. The method of claim 1 in which D is a C3–C5 alkylene radical.

5. The method of claim 3 in which R" is propylene.

6. The method of claim 1 in which x/y is 3 and x+y is 2.

7. The method of claim 6 in which G has the structure $$-CH_2CH_2CH_2(OCH(CH_3)CH_2)_2OCH_3.$$

8. The method of claim 5 in which x/y is 3 and x+y is 2.

9. The method of claim 1 in which the silicone surfactant cell stabilizer is used in an amount of 0.01 to 0.8 parts per hundred parts polyol.

10. The method of claim 1 in which x and y are average values such that x/y is 2.5 to 3.5 and x+y is 1.5 to 2.5, D is a C3–C5 alkylene radical, R" is propylene, m has an average value from 2 to 3 and A is an —OR''' or an —OOCR''' group, where R''' is methyl and/or ethyl.

11. The method of claim 1 in which x and y are average values such that the values of x/y is 3 and x+y is 2, D is a propylene radical, R" is propylene, m has an average value of 2 and A is —OCH3.

12. A polyurethane flexible molded foam composition prepared by mixing the following components in parts by weight (pbw):

|  | (pbw) |
|---|---|
| Polyol | 20–100 |
| Polymer Polyol | 80–0 |
| Silicone Surfactant Cell Stabilizer | 0.01–0.8 |
| Silicone Cell Opener | 0–3 |
| Water | 1–8 |
| Auxiliary Blowing Agent | 0–20 |
| Urethane Catalyst | 0.3–3 |
| Isocyanate Index | 70–115 | in which the silicone surfactant cell stabilizer is a compound having the formula:

$$Me_3Si(OSiMe_2)_x(OSiMeG)_yOSiMe_3$$

wherein G is a group having the formula $-D(OR'')_mA$ where D is a divalent organic linking radical, R" is an alkylene group, m has an average value from 1 to 5, A denotes an —OR''' or an —OOCR''' group, where R''' is selected from the group consisting of methyl, ethyl, and a combination of methyl and ethyl, x has an average value from 1 to 3 and y has an average value from 0.25 to 1, the value of x/y is from 2.5 to 5 and the value of x+y is from 1.5 to 3.5.

13. The foam composition of claim 12 in which x/y is 2.5 to 3.5 and x+y is 1.5 to 2.5.

14. The foam composition of claim 12 in which m is 2 to 3.

15. The foam composition of claim 12 in which D is C3–C5 alkylene radical.

16. The foam composition of claim 12 in which R" is propylene.

17. The foam composition of claim 12 in which x/y is 3 and x+y is 2.

18. The foam composition of claim 17 in which R has the structure $$-CH_2CH_2CH_2(OCH(CH_3)CH_2)_2OCH_3.$$

19. The foam composition of claim 16 in which x/y is 3 and x+y is 2.

20. The foam composition of claim 12 in which x and y are average values such that x/y is 2.5 to 3.5 and x+y is 1.5 to 2.5, D is a C3–C5 alkylene radical, R" is propylene, m has an average value from 2 to 3 and A is an —OR''' or an —OOCR''' group, where R''' is methyl and/or ethyl.

21. The foam composition of claim 13 in which x and y are average values such that x/y is 3 and x+y is 2, D is a propylene radical, R" is propylene, m has an average value of 2 and A is —OCH3.

* * * * *